United States Patent [19]

Brau et al.

[11] 4,193,043
[45] Mar. 11, 1980

[54] MICROWAVE ACCELERATOR E-BEAM PUMPED LASER

[75] Inventors: Charles A. Brau; William E. Stein; Stephen D. Rockwood, all of Los Alamos, N. Mex.

[73] Assignee: The United States of America as represented by the United States Department of Energy, Washington, D.C.

[21] Appl. No.: 832,489

[22] Filed: Sep. 12, 1977

[51] Int. Cl.² ............................................. H01S 3/09
[52] U.S. Cl. ..................... 331/94.5 PE; 331/94.5 E; 331/94.5 D
[58] Field of Search ................. 331/94.5 G, 94.5 PE, 331/94.5 P, 94.5 D

[56] References Cited
U.S. PATENT DOCUMENTS

| | | | |
|---|---|---|---|
| 3,958,189 | 5/1976 | Sprangle et al. | 331/94.5 PE |
| 3,983,508 | 9/1976 | Bradley et al. | 331/94.5 PE |
| 4,047,125 | 9/1977 | Dreyfus | 331/94.5 PE |

OTHER PUBLICATIONS

Hoffman, Appl. Phys. Letters, vol. 28, No. 9, May 1, 1976, pp. 538–539.
Semat, Intro. to Atomic and Nuclear Physics, 4th Ed., 1962 (Holt, Reinhart, N.Y.) pp. 568–569.

Primary Examiner—William D. Larkins
Attorney, Agent, or Firm—R. V. Lupo; William W. Cochran, II

[57] ABSTRACT

A device and method for pumping gaseous lasers by means of a microwave accelerator. The microwave accelerator produces a relativistic electron beam which is applied along the longitudinal axis of the laser through an electron beam window. The incident points of the electron beam on the electron beam window are varied by deflection coils to enhance the cooling characteristics of the foil. A thyratron is used to reliably modulate the microwave accelerator to produce electron beam pulses which excite the laser medium to produce laser pulse repetition frequencies not previously obtainable. An aerodynamic window is also disclosed which eliminates foil heating problems, as well as a magnetic bottle for reducing laser cavity length and pressures while maintaining efficient energy deposition.

27 Claims, 8 Drawing Figures

MICROWAVE ACCELERATOR E-BEAM PUMPED LASER

BACKGROUND OF THE INVENTION

The present invention pertains generally to lasers and more particularly to gaseous e-beam pumped lasers.

Various applications of lasers often require reliable operation at high pulse repetition frequencies, i.e., on the order of >1 kHz, and high average powers. Conventionally, broad area electron beams are used to excite a laser medium transverse to the laser axis. DC sources such as Marx generators and various L-C circuits, operated by spark gap switches, are normally used to produce these transverse electron beams. These devices, however, do not provide desired reliability over extended periods of operation and cannot produce necessary high pulse repetition frequencies, e.g., >1 Hz, for specified photochemical applications. Moreover, the broad area electron beam utilized to excite the laser medium in a transverse mode, causes difficulties in cooling the large area foil and foil support structure required to admit the electron beam into the laser cavity. Additionally, since the amount of current produced by the electron beam is proportional to foil heating, the inherently large currents produced by conventional dc discharge devices further supplement the difficulties encountered with regard to foil heating. These limitations imposed by foil heating restrict average output power and pulse repetition frequencies obtainable from the laser output. In addition to the problems of foil heating which are induced by the transverse excitation arrangement, problems of efficient deposition of energy within the laser cavity are also prevalent, which reduce efficiency of the laser system.

Disadvantages of foil heating and reduced efficiency are overcome, to some extent, by longitudinal pumping of the laser medium along the axis of the laser cavity. Longitudinal excitation of the laser medium reduces foil sizes for easier foil cooling and increases energy deposition due to increased excitation length. Although these smaller area foils reduce the heating problems to some extent, the conventional modes of excitation, i.e., Marx banks generators, etc., perpetuate the inherent disadvantages and limitations of these devices such as the characteristically high currents produced in the e-beams of these devices. Furthermore, even with axial mode excitation, these conventional excitation sources are limited to producing electron beams having energy levels $\leq \sim 2$ MeV.

To optimally reduce the problems of foil heating, 5 to 10 MeV electron beams at small current levels are necessary. Such beams retain the power levels required to efficiently operate an axially pumped laser while minimizing the applied current and, consequently, foil heating. Unfortunately, conventional electron beam sources used to excite laser mediums are incapable of reliably producing electron beams at desired electron voltage levels, low currents, and high pulse repetition frequencies.

SUMMARY OF THE INVENTION

The present invention overcomes the disadvantages and limitations of the prior art by providing a microwave accelerator electron beam for use as an excitation source for gaseous lasers. The electron beam accelerator produces an electron beam having a small current level and selectively high electron voltage levels. The microwave accelerator is extremely reliable in operation and can produce selectively high pulse repetition frequencies. The electron beam can be produced at desirable levels in a small cross sectional area for more efficient foil cooling. In addition, the small area lends itself to deflection by way of deflection coils for multiple foil aperture penetration of the laser cavity.

It is therefore an object of the present invention to provide a microwave linear accelerator pumped laser.

It is also an object of the present invention to provide an improved method of pumping a laser medium.

Another object of the present invention is to provide an improved device for pumping a gaseous laser medium.

Another object of the present invention is to provide a microwave linear accelerator pumped laser for operating at high pulse repetition frequency.

Another object of the present invention is to provide a microwave linear accelerator pumped laser which is reliable in operation over extended periods.

Another object of the present invention is to provide a microwave linear accelerator pumped laser which is capable of producing high average output powers.

Other objects, advantages and novel features of the present invention will become apparent from the following detailed description of the invention when considered in conjunction with the accompanying drawings, wherein:

DETAILED DESCRIPTION OF THE PREFERRED EMBODIMENT OF THE INVENTION

Figure 1:
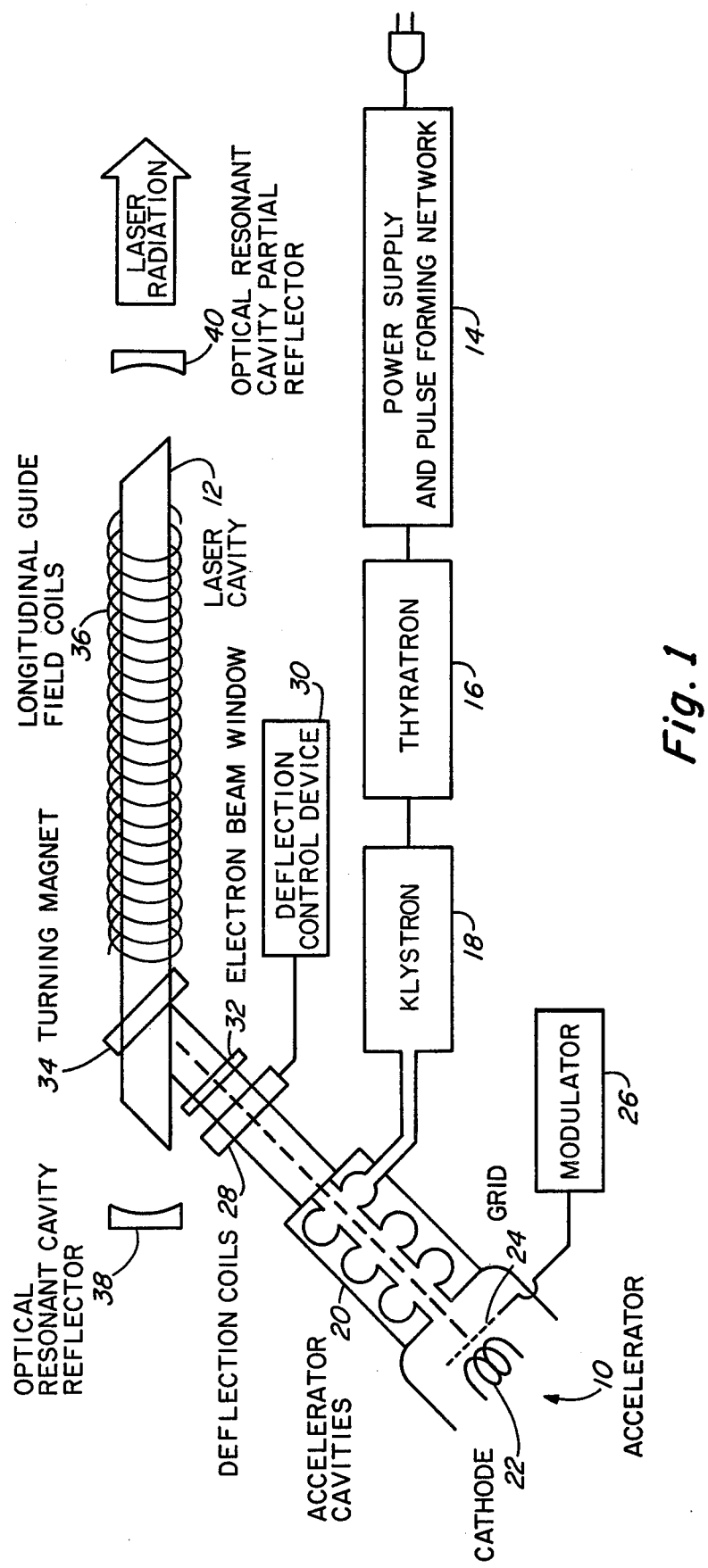
FIG. 1 discloses a schematic diagram of the preferred embodiment of the invention.

Referring to the drawings, FIG. 1 discloses the preferred embodiment of the invention. The preferred embodiment comprises a microwave linear accelerator 10 which produces a longitudinal electron beam in a laser cavity 12 from an off-axis position. The excited gaseous laser medium can comprise any medium suitably excited by means of an electron beam, although the most successful high pressure gas mixtures pumped by relativistic electron beams to achieve ultraviolet laser action have been the rare gas halide lasers such as the KrF laser, which produces $\sim 248$ nm radiation.

The microwave accelerator 10 comprises a power supply and pulse forming network which is controlled by a thyratron 16 to operate klystron 18. The klystron 18 produces microwave energy in accordance with the switching pattern of thyratron 16. The microwave energy produced by the klystron 18 is applied to the accelerator cavities 20 to accelerate the electrons produced by the cathode 22. When the cathode 22 is heated, it emits electrons which are controlled by grid 24 via modulator 26. The microwave energy produced in the accelerator cavities 20 functions to sequentially accelerate the electron beam to increase the electron energy to a desired level, e.g., 10 MeV, in a 1 µs pulse having a total area of about 1 cm$^2$ and ~10 amps total average current during each pulse. After startup and steady state conditions are achieved, thyratron 16 can be utilized to operate the accelerator in a pulsed mode at a pulse repetition frequency ranging from 1 to 10 kHz. At pulse frequencies >100 kHz, modulation can be achieved by operating klystron 18 in a cw mode such that the microwave energy is stored between pulses in the accelerator cavities 20. The modulator 26, connected to grid 24, can then be utilized to modulate the production of electrons being accelerated through the accelerator cavity 20 at a desired pulse repetition frequency >100 kHz.

Figure 2:
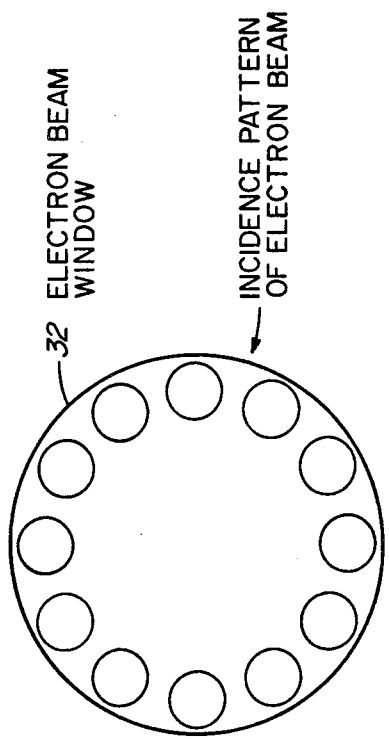
FIG. 2 discloses a schematic drawing of an incidence pattern of a deflected electron beam.
Figure 4:
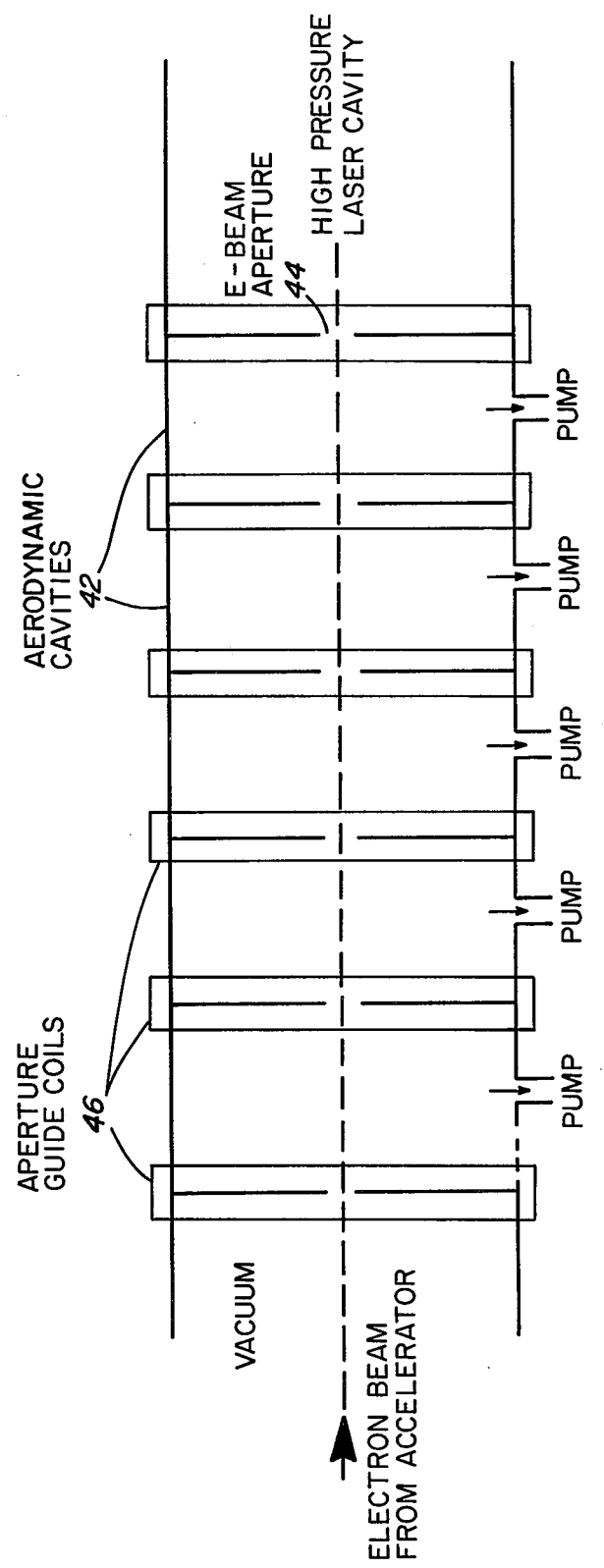
FIG. 4 discloses a schematic diagram of an aerodynamic window.

Since the electrons produced by the accelerator are confined to a small cross sectional area and have fairly high electron energies, i.e., ~10 MeV, and small current levels, foil heating is substantially reduced over conventional electron beam excitation devices. However, deflection coils 28 and deflection control device 30 function to deviate the electron beam in a predetermined pattern on the surface of the electron beam window foil 32 to further reduce potential foil heating problems. A typical deflection pattern produced by deflection coils 28 and deflection control device 30 is illustrated in FIG. 2, which shows the incident pattern of the electron beam on the foil electron beam window 32. The selected incidence beam pattern substantially increases the conduction cooling of the foil to the foil support structure to effectively separate the multiatmospheric gaseous medium of the laser cavity 12 from the vacuum required within the accelerator cavities 20. Aluminum foil or similar material which is noncorrosive to the gaseous laser medium and which has high strength and good conduction characteristics is preferred. Alternatively, rotating permanent magnets can be used to deflect the beam in any desired manner. In addition, the foils can be moved mechanically, instead of deflecting the beam, to reduce foil heating problems.

The electron beam, applied to the laser cavity 12 through the electron beam window 32, is directed along the longitudinal axis of the laser cavity 12 by means of a turning magnet 34. In the preferred embodiment ~5 to 10 atm of the combined neon, krypton, fluorine laser medium is utilized, of which ~5% constitutes Kr while 0.1% constitutes $F_2$. Multiatmospheric gas pressures are utilized to reduce the penetration length of the electron beam at 10 MeV through the gaseous medium and achieve more efficient deposition of energy within the laser cavity. The difficulty of confining the electron beam to the laser volume is due to the fact that at higher electron energies, the range of the electron beam in the laser gas becomes longer. Thus, for a 10 MeV beam incident on argon, the range is about 6 g/cm$^2$, or about 36 atm-m of gas. Thus, at 8 atm total pressure of argon, the length of a 10 MeV pumped laser is ~3 m to achieve total absorption. At these multiatmospheric pressures, however, nuclear collisons deflect the electron perpendicular to the beam axis causing problems of electron beam confinement to the longitudinal axis of the laser. These problems are overcome by the use of longitudinal guide field coils 36 which confine the electron beam to the axis of the laser cavity 12.

The optical resonant cavity is formed from optical resonant cavity reflector 38 and optical resonant cavity partial reflector 40. The excitation of the KrF laser medium produces output radiation at 248 nm.

Figure 3:
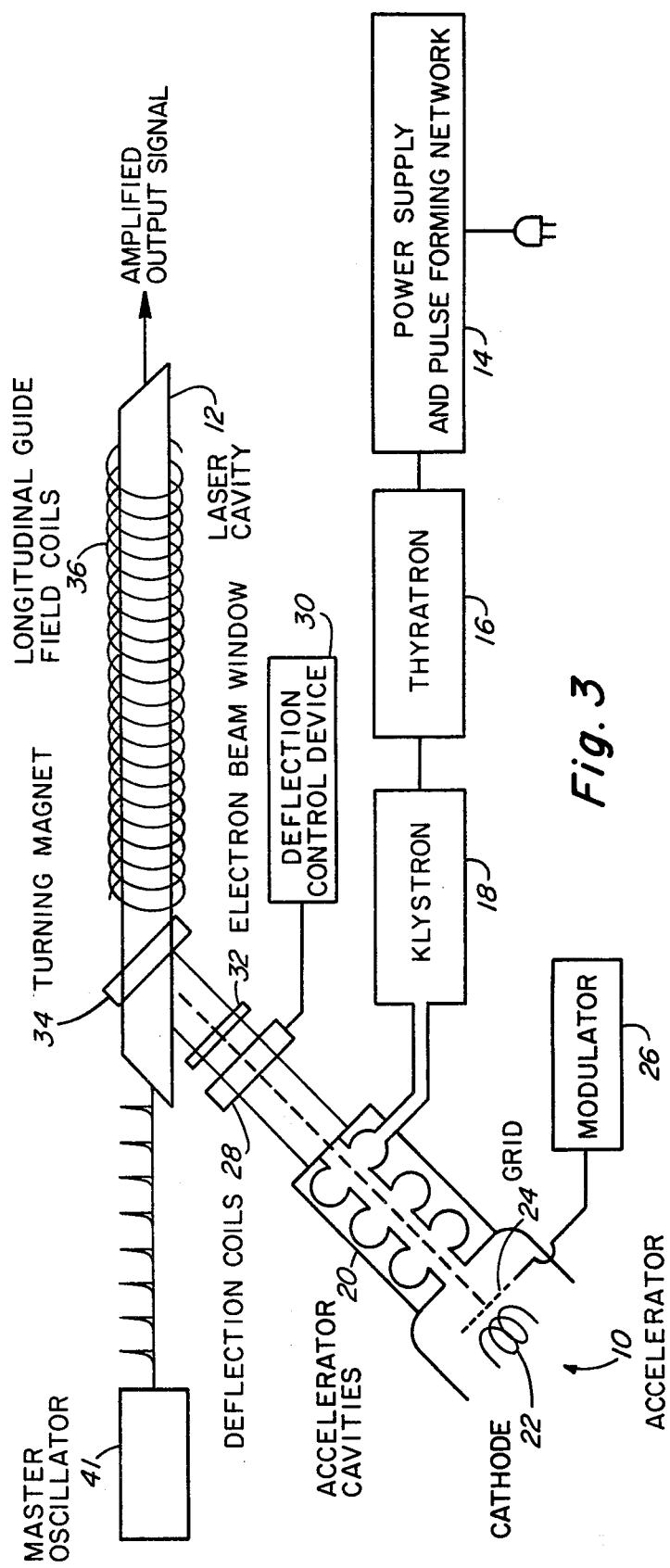
FIG. 3 discloses a schematic diagram of a laser amplifier arrangement of the device of FIG. 1.

Although the optical resonant cavity shown in FIG. 1 can be used for producing desired laser wavelengths at desired power levels and pulse repetition frequencies, the device can also be operated in an amplification mode such as shown in FIG. 3. According to the arrangement in FIG. 3, master oscillator 41, produces a signal which can be accurately controlled for desired frequency, line narrowing, pulse length and shape, and polarization. Gratings which would normally be burned out in larger lasers such as shown in FIG. 1, can be used in the master oscillator 41 for controlling various parameters. Any suitable laser can be used as a master oscillator 41 including YAG lasers, various dye lasers or any laser for producing a desired signal, of the wavelength appropriate for the amplifying medium including modelocked lasers and Q-switched lasers.

FIG. 3 discloses an aerodynamic window which can be utilized as electron beam window 32 in place of a conventional foil window, eliminating the need for deflection coils 28 and deflection control circuitry 30. The aerodynamic electron beam window shown in FIG. 3 comprises a series of aerodynamic cavities 42 having connected e-beam apertures. Each of the aerodynamic cavities 42 is connected to a vacuum pump for reducing the pressure within the cavity such that a vacuum is maintained at the accelerator end of the window and multiatmospheric pressure at the laser cavity end of the window. A series of aperture guide coils 46 confine the electron beam to the e-beam apertures 44 thereby preventing collisions with the aerodynamic cavity 42. The aerodynamic window shown in FIG. 3 reduces the problem of dispersion of the electron beam when it contacts a standard foil window and eliminates all the problems of foil heating.

Figure 5:
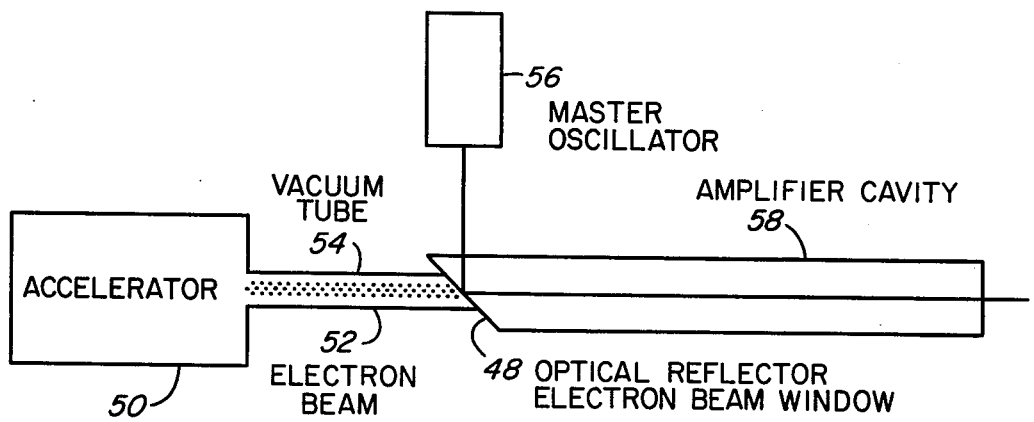
FIG. 5 discloses a schematic diagram of an arrangement for using a combined e-beam window and optical reflector.

FIG. 5 discloses an arrangement for using a combined optical reflector electron beam window 48. As shown in FIG. 5, accelerator 50 generates an electron beam 52 which is applied to the combined optical reflector electron beam window 48 via vacuum tube 54. Master oscillator 56 produces the optical signal which is directed towards the optical reflector electron beam window 48 for reflection along the length of the amplifier cavity 58. The arrangement of FIG. 5 eliminates the need for turning magnet 34 as shown in FIG. 3, since the electron beam 52 is applied directly along the longitudinal axis of the amplifier 58.

Figure 6:
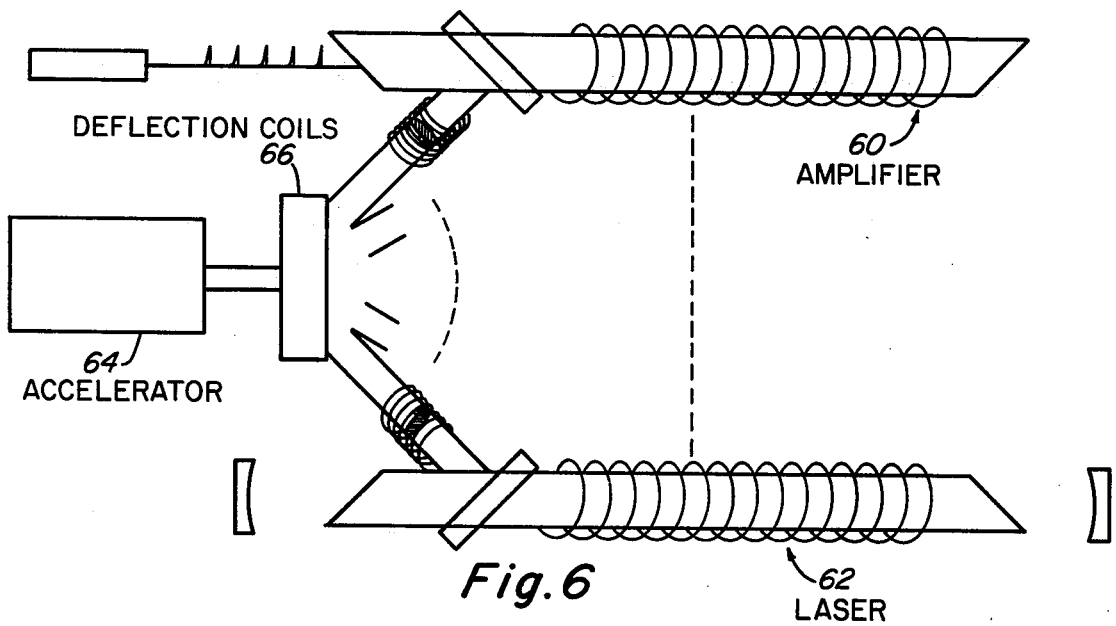
FIG. 6 discloses a schematic diagram of an arrangement for pumping multiple lasers or laser amplifiers from a single accelerator.

FIG. 6 is a schematic diagram of an arrangement for exciting a plurality of amplifiers 60 or lasers 62 from a single accelerator 64. In operation, deflection coil 66 directs electron beam pulses along one of a plurality of vacuum tubes to excite one of the plurality of amplifiers 60 or lasers 62. Such an arrangement has the advantage of reducing the number of required accelerators 64 thereby greatly reducing capital investment per photon. Since accelerator 64 may be operated at pulse repetition frequencies in excess of 100 kHz, a plurality of individual lasers can be operated in the range of 10 kHz from a single accelerator.

Figure 7:
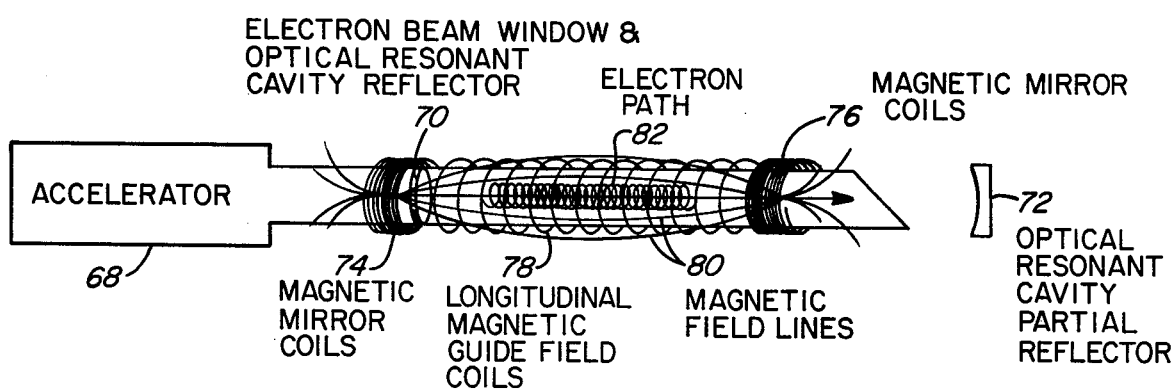
FIG. 7 discloses the use of a magnetic bottle for retaining the electron beam within a limited length of the laser cavity.

FIG. 7 schematically discloses a magnet bottle arrangement for retaining the electron beam produced by accelerator 68 within a predetermined volume of the laser cavity. In operation, accelerator 68 produces an electron beam which penetrates the laser cavity via combined electron beam window and optical resonant cavity reflector 70. The optical resonant cavity is formed between the optical resonant cavity reflector 70 and optical resonant cavity partial reflector 72. In the design of the laser cavity, predetermined length and laser medium pressures must be established to achieve efficient energy deposition of the electron beam in the laser medium. The magnetic bottle disclosed in FIG. 7, comprising magnetic mirror coils 74 and 76 and longitudinal magnetic guide field coils 78, establish magnetic field lines 80 to retain the electron beam within the magnetic bottle formed within the cavity. In this manner, gaseous pressures of the laser medium and cavity length can be selected independently of electron beam excitation level, while maintaining maximum energy deposition.

Figure 8:
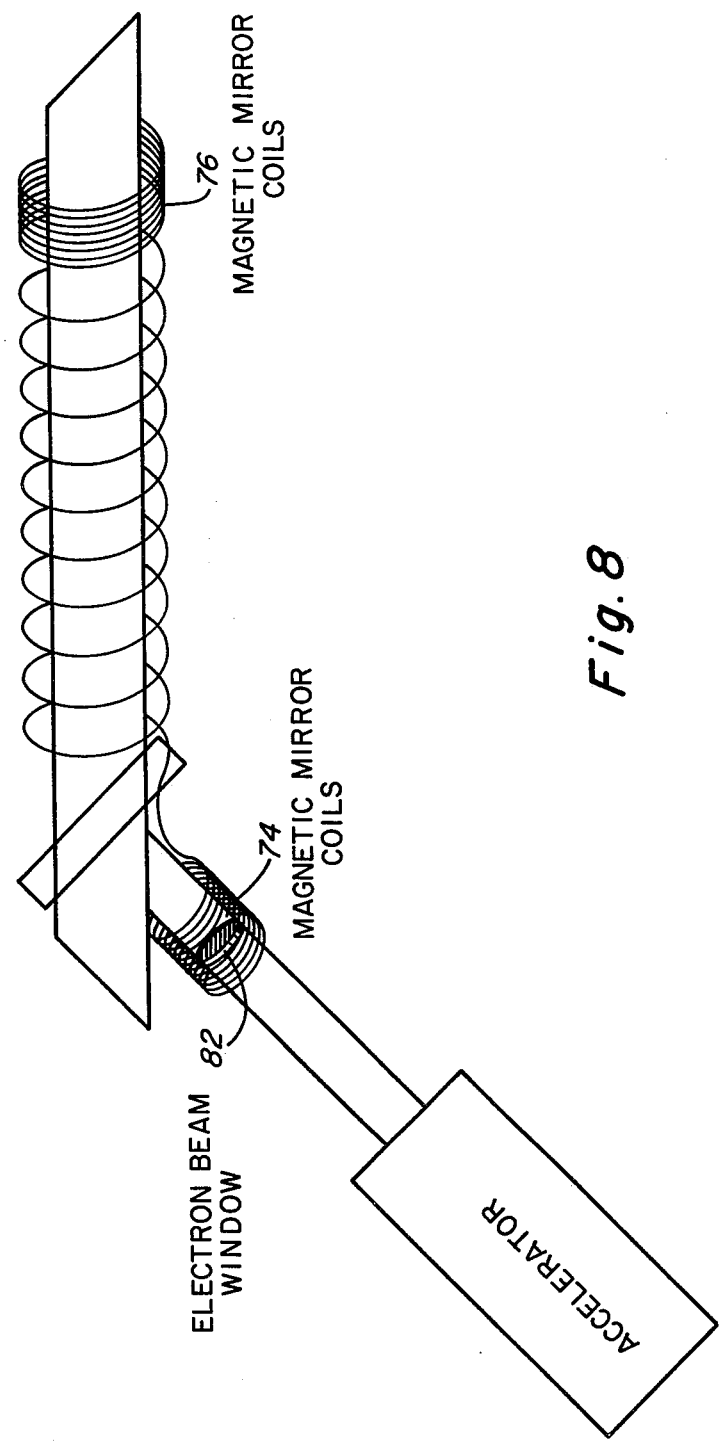
FIG. 8 discloses an off-axis pumping arrangement utilizing magnetic mirrors.

FIG. 8 discloses the use of a magnetic bottle in an off-axis pumping arrangement wherein magnetic mirror coil 74 is disposed around the electron beam window 82 or, towards the high pressure side of the electron beam window with a gradual magnetic field to funnel the electron beam into the magnetic bottle. Such an arrangement prevents foil heating from movement of electrons within the magnetic bottle and allows for multiple aperture scanning of the incident electron beam on the electron beam window 82.

The present invention therefore provides a means for maximizing energy deposition of an electron beam pumping source in a laser medium through the use of a microwave linear accelerator. The accelerator provides an extremely reliable source of electrons over extended periods of operation at pulse repetition frequencies which can be varied over an extremely wide range. Since the electron beam produces small currents in small cross sectional areas at electron voltages which can be varied to desired levels, limitations of foil cooling are minimized.

Obviously many modifications and variations of the present invention are possible in light of the above teachings. For example, any number of a gaseous laser medium can be excited by these methods including the mercury halides, the rare gas eximers, charge transfer lasers, and any number of high pressure electronic transition lasers or e-beam initiated chemical lasers such as the Hf lasers or DC1 lasers. Moreover, any particular arrangement of the various embodiments disclosed herein utilizing magnetic mirrors, combined optical reflector electron beam windows, or aerodynamic windows is certainly within the purview of the present invention. It is therefore to be understood that within the scope of the appended claims the invention may be practiced otherwise than as specifically described.

What is claimed is:

1. A device for pumping gaseous lasers comprising:
   microwave linear accelerator means for generating a relativistic electron beam having energy sufficient to ionize and excite a gaseous laser medium;
   means for modulating said accelerator means to produce a modulated relativistic electron beam; and,
   means for applying said modulated relativistic electron beam to said laser medium.

2. The device of claim 1 wherein said means for applying said modulated relativistic electron beam to said laser medium comprise an electron beam window.

3. The device of claim 2 further comprising a turning magnet.

4. A device for exciting a gaseous laser medium to an upper laser level comprising:
   microwave linear accelerator means for producing a relativistic electron beam having sufficient energy to ionize and excite said gaseous laser medium;
   means for applying said relativistic electron beam to said laser medium.

5. The device of claim 4 wherein said means for applying said relativistic electron beam to said laser medium comprises:
   an electron beam window;
   a turning magnet;
   means for producing a longitudinal magnetic guide field to confine said electron beam.

6. The device of claim 4 further comprising magnetic mirror means for retaining said electron beam within a magnetic bottle formed within said cavity by said magnetic mirror means.

7. The device of claim 4 further comprising means for modulating said electron beam.

8. The device of claim 7 wherein said means for modulating said electron beam comprises switching means for modulating microwave power to said microwave linear accelerator means.

9. The device of claim 7 wherein said means for modulating said electron beam comprises means for modulating electron production within said microwave linear accelerator.

10. The device of claim 5 wherein said electron beam window is formed from a metallic foil.

11. The device of claim 5 wherein said electron beam window is formed from plastic.

12. The device of claim 4 wherein said means for applying said relativistic electron beam to said laser medium comprises an aerodynamic window.

13. The device of claim 4 wherein said means for applying said relativistic electron beam to said laser medium comprises:
   an electron beam window; and,
   means for spatially deflecting said electron beam to intersect with said electron beam window at more than one location.

14. The device of claim 13 wherein said electron beam window comprises a laser optical resonant cavity reflector.

15. The device of claim 4 wherein said means for applying said relativistic electron beam to said laser medium comprises a laser optical resonant cavity reflector.

16. A microwave accelerator pumped laser comprising:
   microwave linear accelerator means for generating a relativistic electron beam having sufficient energy to ionize and excite a gaseous laser medium;
   a laser cavity containing said gaseous medium;
   means for directing said electron beam along the longitudinal axis of said laser cavity;
   means for producing a longitudinal magnetic guide field to confine said electron beam along said longitudinal axis of said laser cavity.

17. The microwave accelerator pumped laser of claim 16 wherein said means for directing said electron beam along the longitudinal axis of said laser cavity comprises a turning magnet.

18. The microwave accelerator pumped laser of claim 16 further comprising an electron beam window connected to said laser cavity.

19. The microwave accelerator pumped laser of claim 18, wherein said electron beam window is formed from a metallic foil.

20. The microwave accelerator pumped laser of claim 18 wherein said electron beam window is formed from plastic.

21. The microwave accelerator pumped laser of claim 18 wherein said electron beam window comprises a laser resonant cavity reflector.

22. The microwave accelerator pumped laser of claim 16 wherein said microwave linear accelerator means includes means for modulating said relativistic electron beam.

23. The microwave accelerator pumped laser of claim 22 wherein said means for modulating said relativistic electron beam comprises switching means for modulating microwave power to said microwave linear accelerator means.

24. The microwave accelerator pumped laser of claim 22 wherein said means for modulating said relativistic electron beam comprises means for modulating electron production within said microwave linear accelerator.

25. The microwave accelerator pumped laser of claim 16 further comprising magnetic mirror means formed about said laser cavity for retaining said electron beam within a magnetic bottle formed within said cavity by said magnetic mirror means.

26. A method for exciting a laser medium comprising the steps of:
producing a relativistic electron beam from a microwave linear accelerator;
applying said electron beam to a gaseous laser medium to ionize and excite said medium.

27. The method of claim 26 wherein said step of producing a relativistic electron beam comprises:
producing electrons from a cathode;
accelerating said electrons in a microwave accelerator.

* * * * *